United States Patent
Choi

(10) Patent No.: US 12,049,268 B2
(45) Date of Patent: Jul. 30, 2024

(54) ELASTIC CRAWLER

(71) Applicant: Yong Jae Choi, Daejeon (KR)

(72) Inventor: Yong Jae Choi, Daejeon (KR)

(73) Assignee: Yong Jae Choi, Daejeon (KR)

( * ) Notice: Subject to any disclaimer, the term of this patent is extended or adjusted under 35 U.S.C. 154(b) by 501 days.

(21) Appl. No.: 17/202,378

(22) Filed: Mar. 16, 2021

(65) Prior Publication Data

US 2021/0354770 A1 Nov. 18, 2021

(30) Foreign Application Priority Data

May 12, 2020 (JP) .................................. 2020-083688
Nov. 25, 2020 (KR) ......................... 10-2020-0159674

(51) Int. Cl.
*B62D 55/24* (2006.01)
(52) U.S. Cl.
CPC .................................. *B62D 55/244* (2013.01)
(58) Field of Classification Search
CPC ........................... B62D 55/244; B62D 55/242
USPC ......................................................... 305/177
See application file for complete search history.

(56) References Cited

U.S. PATENT DOCUMENTS 9,193,401 B2 * 11/2015 Shimozono .......... B62D 55/244

FOREIGN PATENT DOCUMENTS

| CN | 2383744 Y | 6/2000 | |
|---|---|---|---|
| EP | 1640254 A1 * | 3/2006 | .......... B62D 55/244 |
| EP | 3323700 B1 | 12/2022 | |
| JP | 05-016844 A | 1/1993 | |
| JP | 05016844 * | 1/1993 | .......... B62D 55/253 |
| JP | 2001-341676 A | 12/2001 | |
| JP | 4675236 B | 4/2011 | |
| JP | 2012-228941 A | 11/2012 | |

* cited by examiner

*Primary Examiner* — S. Joseph Morano
*Assistant Examiner* — Eva L Comino
(74) *Attorney, Agent, or Firm* — Harvest IP Law, LLP

(57) ABSTRACT

To prevent lateral slip of core metals and vertical vibration of track rollers and improve bendability of a crawler main body between core metals.
Core metals 8 that are embedded at substantially equal intervals in a crawler revolving direction inside a crawler main body 7 are included, lateral slip preventing protrusions 15 and 16 that at both sides in a crawler width direction of the core metals 8 project to both sides in the crawler revolving direction and prevent lateral slip of adjacent core metals 8 with respect to each other in the crawler width direction are included, first track roller rolling portions 21 provided on the core metals 8 between the respective lateral slip preventing protrusions 15 and 16 at both sides in the crawler revolving direction are included, and the respective lateral slip preventing protrusions 15 and 16 have lateral slip preventing portions 15*a* and 16*a* that are in proximity in the crawler width direction between the respective lateral slip preventing protrusions 15 and 16 that are adjacent in the crawler width direction and second track roller rolling portions 15*b* and 16*b* that are provided on the lateral slip preventing portions 15*a* and 16*a* such as to be separated in the crawler width direction.

7 Claims, 10 Drawing Sheets

ELASTIC CRAWLER

CROSS-REFERENCE TO RELATED APPLICATIONS

This application claims the benefit of Japanese Patent Application No. P-2020-08388, filed with the Japan Patent Office on May 12, 2020, and Korean Patent Application No. 10-2020-0159674, filed with the Korean Intellectual Property Office on Nov. 25, 2020. The disclosures of the above applications are incorporated herein by reference in their entirety.

BACKGROUND

1. Technical Field

The present invention relates to an elastic crawler used in a crawler device in a construction machine, etc.

2. Description of the Related Art

An elastic crawler used in a crawler device includes a crawler main body constituted of rubber or other elastic material, core metals that are embedded at substantially equal intervals in a crawler revolving direction inside the crawler main body, and tension members embedded in the crawler revolving direction inside the crawler main body at outer peripheral sides of the respective core metals.

Among this type of elastic crawlers, there is that with which lateral slip preventing protrusions projecting to both sides in the crawler revolving direction are provided at both sides in a crawler width direction of each core metal such that when an external force in a lateral direction is applied during turning or during travel on sloping ground, the lateral slip preventing protrusions of two adjacent core metals engage with each other in the crawler width direction to prevent lateral slip of the core metals with respect to each other and meanwhile, upper surfaces of the respective lateral slip preventing protrusions are arranged as track roller rolling portions and track rollers are arranged to roll continuously on the track roller rolling portions of the respective core metals during revolving of the crawler main body.

An example of a conventional elastic crawler is disclosed in Japanese patent publication No. H5-345581.

SUMMARY OF THE INVENTION

This conventional elastic crawler has advantages of being capable of preventing lateral slip during turning or during travel on sloping ground and being capable of preventing vertical vibration of the track rollers during rolling. However, since the lateral slip preventing protrusions of two adjacent core metals are in a state of being in proximity to each other in the crawler width direction, there is a disadvantage in that a groove for bending cannot be formed between the lateral slip preventing protrusions in the engaged state and bendability between core metals of the crawler main body is decreased.

Also, since an entire width in the crawler width direction of each lateral slip preventing protrusion is arranged as a track roller rolling portion, there is a disadvantage in that a dimension of the lateral slip preventing protrusion in a crawler thickness direction is made thick and a weight of an entire core metal including the lateral slip preventing protrusions is made heavy.

The present invention has been made in view of such problems of the conventional art and an object thereof is to provide an elastic crawler that is capable of preventing lateral slip of core metals and vertical vibration of track rollers and is capable of improving bendability of a crawler main body between core metals.

The present invention is an elastic crawler including a crawler main body that is mainly constituted of an elastic material and core metals that are embedded at substantially equal intervals in a crawler revolving direction inside the crawler main body and including, lateral slip preventing protrusions that at both sides in a crawler width direction of the core metals project to both sides in the crawler revolving direction and prevent lateral slip of adjacent core metals with respect to each other in the crawler width direction, and in which first track roller rolling portions provided on the core metals between the respective lateral slip preventing protrusions at both sides in the crawler revolving direction are included and the respective lateral slip preventing protrusions have lateral slip preventing portions that are in proximity in the crawler width direction between the respective lateral slip preventing protrusions that are adjacent in the crawler width direction and second track roller rolling portions that are provided on the lateral slip preventing portions such as to be separated in the crawler width direction.

Between the respective lateral slip preventing protrusions that are adjacent in the crawler width direction, at least one of the lateral slip preventing protrusions may be provided with the lateral slip preventing portion and the second track roller rolling portion to be of L shape in cross section. The respective lateral slip preventing protrusions may have at least the lateral slip preventing portions embedded inside the crawler main body.

The crawler main body may have first recesses in the crawler revolving direction that are formed between the second track roller rolling portions of the lateral slip preventing protrusions that are adjacent in the crawler width direction and second recesses in the crawler width direction that are formed between the first track roller rolling portions and the second track roller rolling portions in continuation to the first recesses. Upper surfaces of the respective second track roller rolling portion may be of substantially the same height as upper surfaces of the first track roller rolling portions or of a height close to the upper surfaces of the first track roller rolling portions.

The second track roller rolling portions may be of substantially the same projection length in the crawler revolving direction as the lateral slip preventing portions or shorter than the projection length in the crawler revolving direction of the lateral slip preventing portions. The core metals may each include an engaging portion positioned between engaging holes of the crawler main body, guide protrusions projecting from both sides of the engaging portion toward an anti-tread side of the crawler main body, and blade portions provided at outer sides in the crawler width direction with respect to the guide protrusions.

With the present invention, there are advantages of being capable of preventing lateral slip of the core metals and vertical vibration of the track rollers and enabling improvement of bendability of the crawler main body between the core metals.

DETAILED DESCRIPTION OF THE INVENTION

Figure 1:
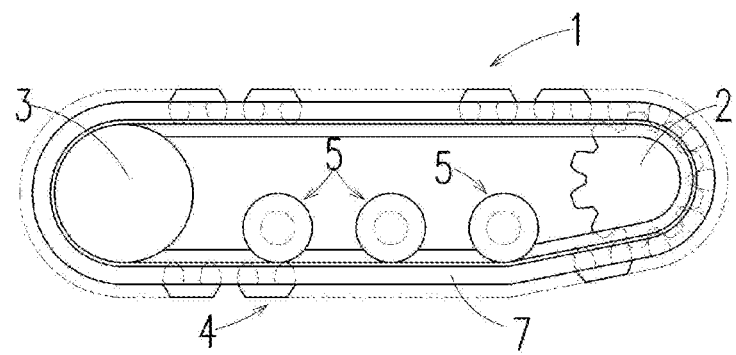
FIG. 1 is a side view of a crawler device that illustrates a first embodiment of the present invention.
Figure 2:
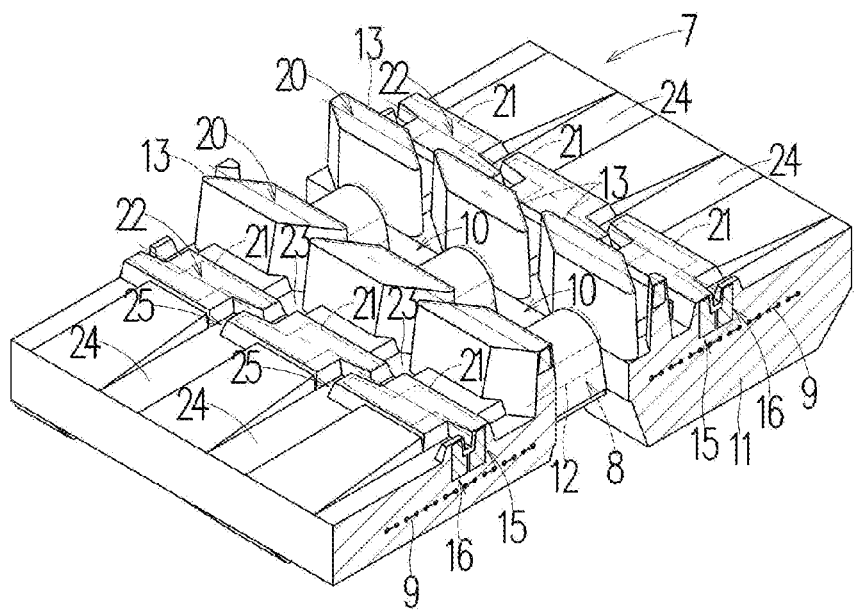
FIG. 2 is a perspective view of an elastic crawler.
Figure 3:
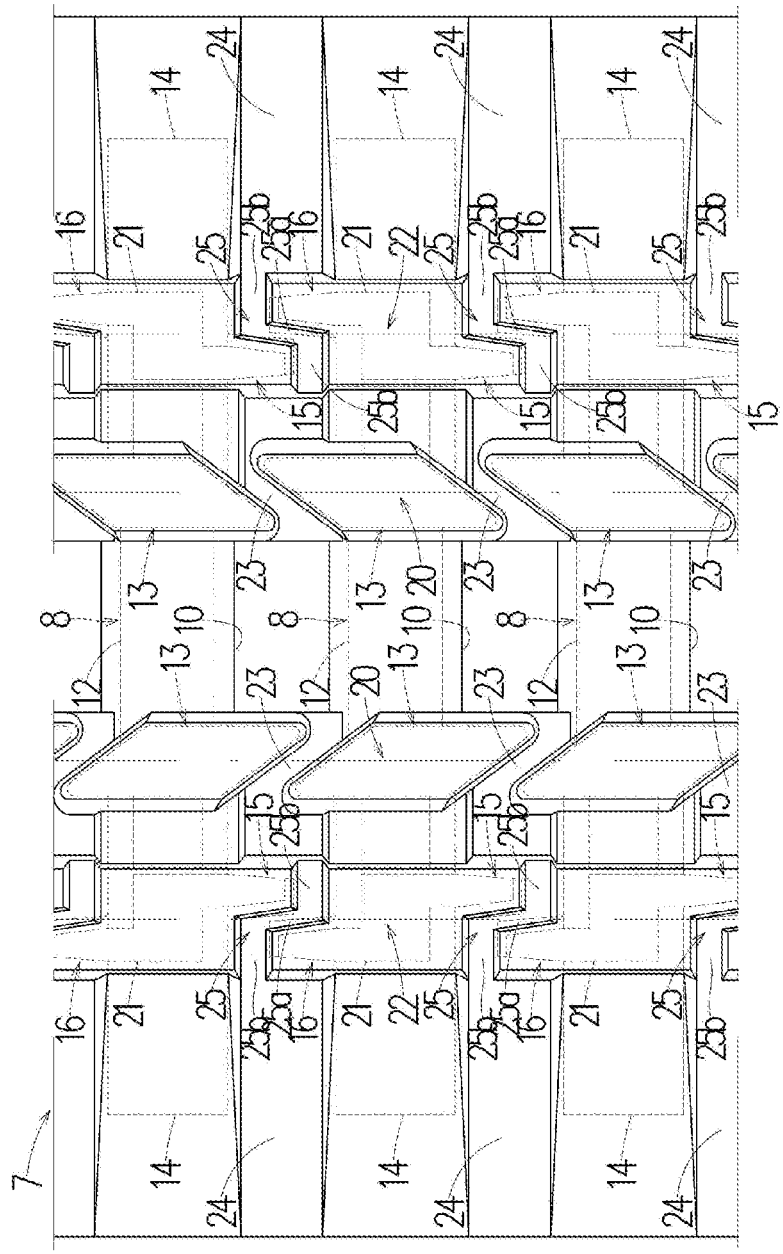
FIG. 3 is a plan view of the elastic crawler.
Figure 4:
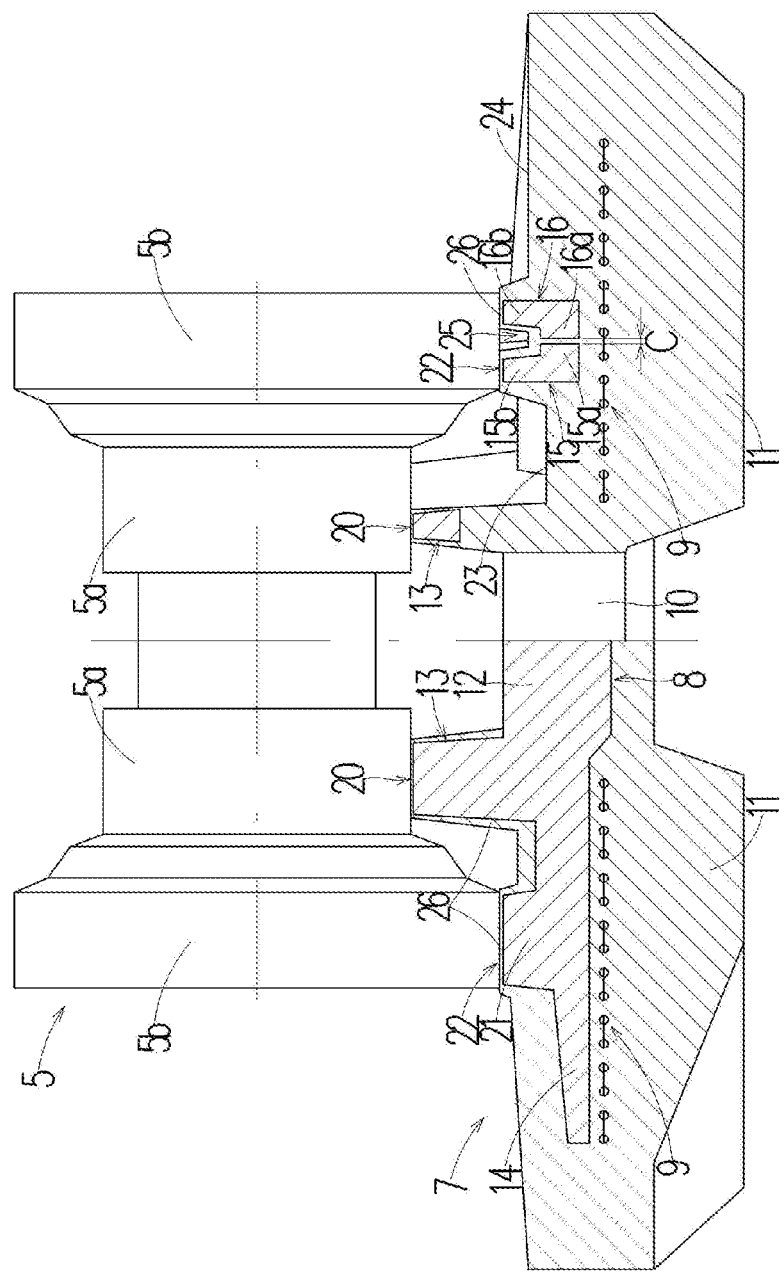
FIG. 4 is a front sectional view of the elastic crawler.
Figure 5:
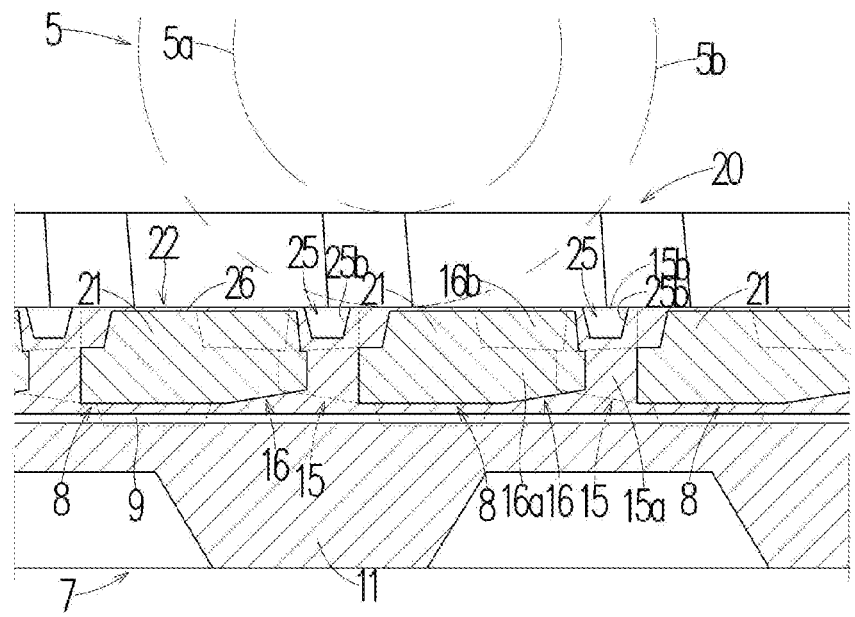
FIG. 5 is a side sectional view of the elastic crawler.
Figure 6:
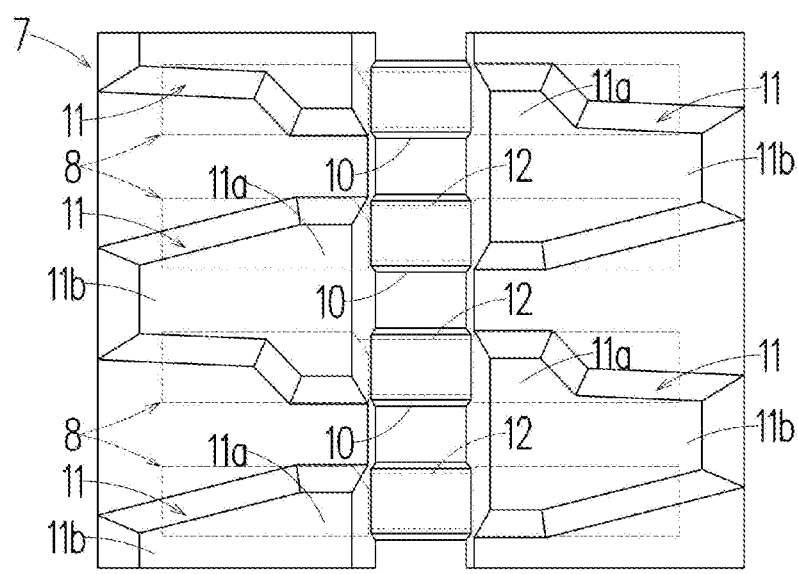
FIG. 6 is a bottom view of the elastic crawler.

Respective embodiments of the present invention shall now be described in detail based on the drawings. FIG. 1 to FIG. 10 illustrate a first embodiment of the present invention. As shown in FIG. 1, a crawler device 1 includes a driving wheel 2 and a driven wheel 3 made of sprockets that are disposed at front and rear and an elastic crawler 4 revolvably wound across the driving wheel 2 and the driven wheel 3, and also, the elastic crawler 4 is guided by a plurality of track rollers 5 disposed between the driving wheel 2 and the driven wheel 3.

As shown in FIG. 2 to FIG. 6, the elastic crawler 4 includes a crawler main body 7 of endless belt shape that is constituted of rubber or other elastic material, core metals 8 of a crawler width direction (lateral direction) that are embedded at substantially equal intervals in a crawler revolving direction inside the crawler main body 7, and steel wires or other tension members 9 that are embedded in the crawler revolving direction inside the crawler main body 7 at a tread side of the respective core metals 8.

The crawler main body 7 is provided with engaging holes 10 at intervals between the respective core metals 8 at a center in the crawler width direction and is provided with drive lugs 11 at both sides in the crawler width direction at the tread side. The drive lugs 11 are each of a shape having a wide width portion 11a at an inner side close to the engaging holes 10 and having a narrow width portion 11b at an outer side far from the engaging holes 10 and are disposed in staggered arrangement at both sides in the crawler width direction such as to correspond alternately to the respective engaging holes 10 in the crawler revolving direction.

Figure 7:
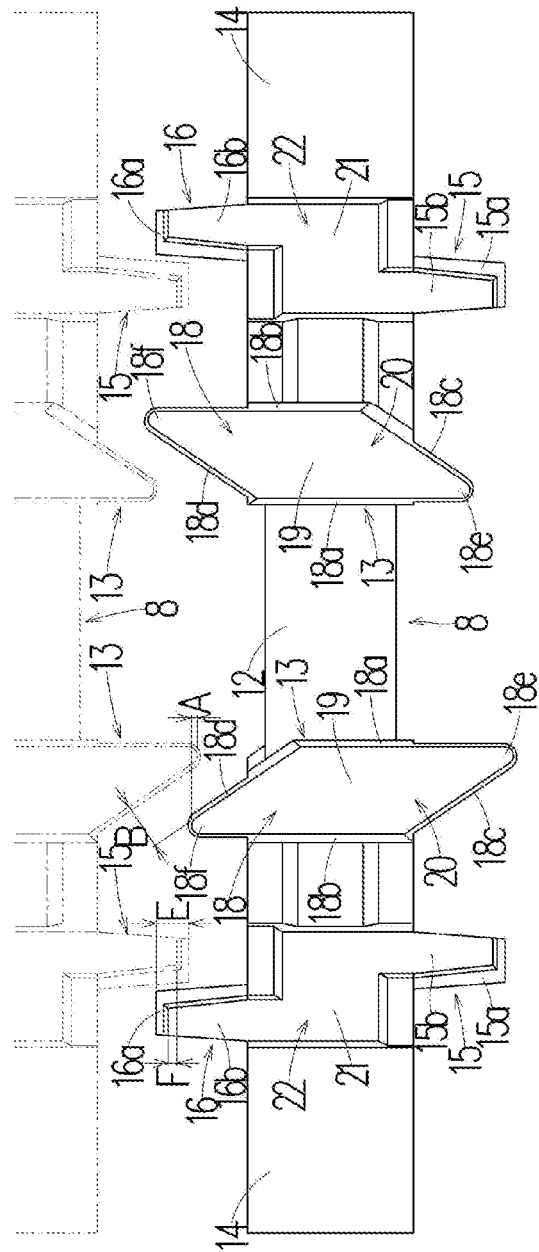
FIG. 7 is a plan view of a core metal.
Figure 8:
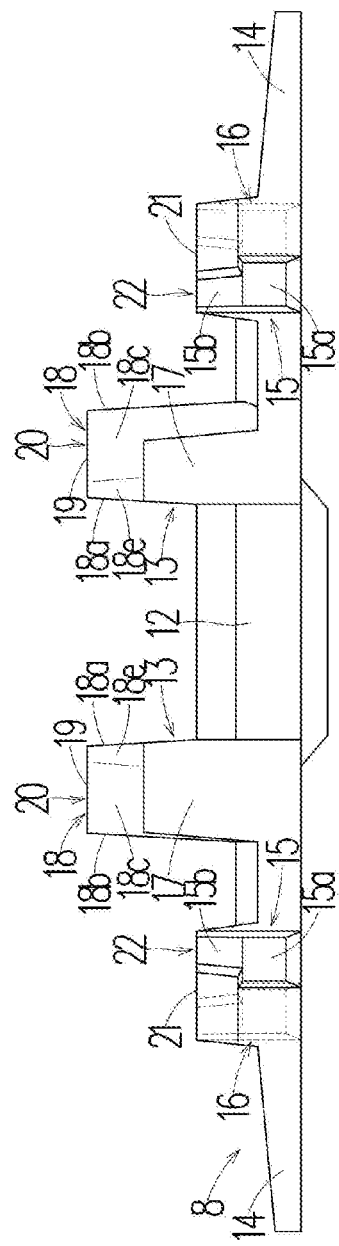
FIG. 8 is a front view of the core metal.
Figure 9:
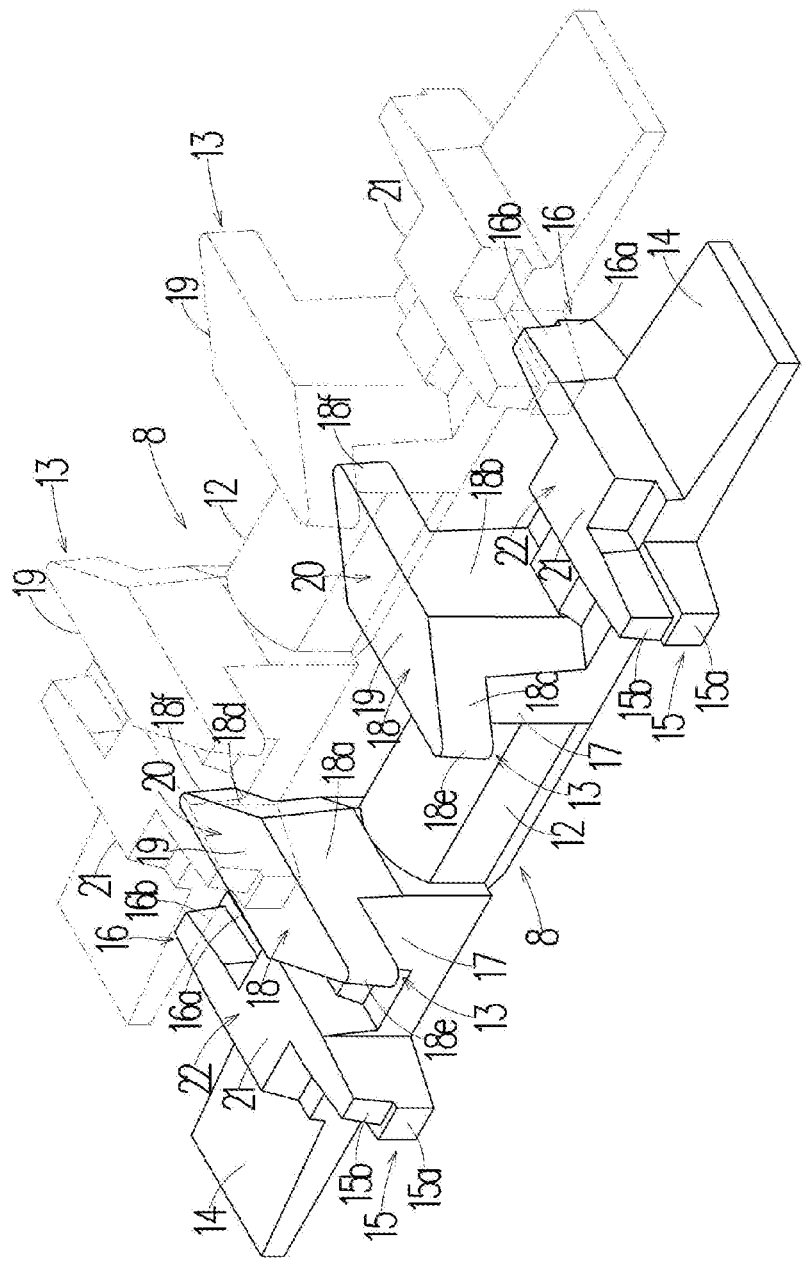
FIG. 9 is a perspective view of the core metal.

The core metals 8 are made by casting or forging and, as shown in FIG. 7 to FIG. 9, each include an engaging portion 12 that is disposed between the engaging holes 10 and engages with engaging projections at outer peripheries of the driving wheel 2 and the driven wheel 3, guide protrusions 13 that project in a crawler thickness direction toward an anti-tread side from both sides of the engaging portion 12 in the crawler width direction and guide the driving wheel 2 and the driven wheel 3 from both sides, blade portions 14 of flat shape that project outward in the crawler width direction from the respective guide protrusions 13, and lateral slip preventing protrusions 15 and 16 that project toward both sides in the crawler revolving direction from the respective blade portions 14.

The guide protrusions 13 each integrally include a base portion 17 and a rhomboid top portion 18 on the base portion 17. The rhomboid top portion 18 has substantially parallel side walls 18a and 18b at both inner and outer sides that are disposed in substantially orthogonal directions to the crawler revolving direction and substantially parallel inclining walls 18c and 18d that are disposed inclinedly in oblique directions with respect to the side walls 18a and 18b at both sides in the crawler revolving direction and is formed to a substantially rhomboid shape in plan view.

The rhomboid top portions 18 of each core metal 8 each have projections 18e and 18f of acute angle shape that project in opposite directions from the base portion 17 toward both sides in the crawler revolving direction. A top surface of each rhomboid top portion 18 is of a flat shape of substantially uniform height and the top of the rhomboid top portion 18 is arranged as a third track roller rolling portion 19 for rolling of the track rollers 5.

With two core metals 8 that are adjacent in the crawler revolving direction, the projections 18e and 18f overlap with each other by an overlap amount A in the crawler revolving direction, such that the rhomboid top portions 18 of the respective guide protrusions 13 form track roller rolling paths 20 that are continuous without interruption in the crawler revolving direction, and are also provided with a predetermined interval B, such that the rhomboid top portions 18 of the guide protrusions 13 do not interfere with each other in the crawler revolving direction even when wound around the driving wheel 2, etc.

A first track roller rolling portion 21 that is of a rectangular shape in plan view and rises in a trapezoidal shape is provided on each wing portion 14 between the lateral slip preventing protrusions 15 and 16. The lateral slip preventing protrusions 15 and 16 project to both sides in the crawler revolving direction from the first track roller rolling portion 21. With the lateral slip preventing protrusions 15 and 16, the one lateral slip preventing protrusion 15 is positioned at a side of the first track roller rolling portion 21 close to the guide protrusion 13, the other lateral slip preventing protrusion 16 is positioned at a side of the first track roller rolling portion 21 far from the guide protrusion 13, and the lateral slip preventing protrusions 15 and 16 of the core metals 8 that are adjacent in the crawler revolving direction are disposed adjacently in the crawler width direction.

The respective lateral slip preventing protrusions 15 and 16 integrally include lateral slip preventing portions 15a and 16a being large in lateral width in the crawler width direction and second track roller rolling portions 15b and 16b disposed shifted to opposite sides in the crawler width direction on the lateral slip preventing portions 15a and 16a and are formed to be of substantially L shapes in cross section.

Figure 10:
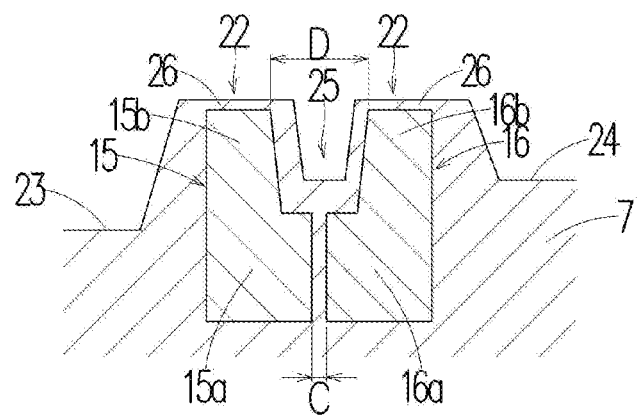
FIG. 10 is an enlarged sectional view of principal portions.

Looking at the lateral slip preventing protrusions 15 and 16 mutually between adjacent core metals 8, the lateral slip preventing portions 15a and 16a are in proximity at a small interval C in the crawler width direction and the second track roller rolling portions 15b and 16b are disposed to be separated by a large interval D in the crawler width direction as shown in FIG. 10.

The lateral slip preventing portions 15a and 16a are slightly longer in projection length than the second track roller rolling portions 15b and 16b and projecting end sides thereof overlap in the crawler revolving direction by a predetermined overlap amount E. Upper surfaces of the respective second track roller rolling portions 15*b* and 16*b* are of substantially the same height as upper surfaces of the first track roller rolling portions 21 and projecting end sides thereof overlap in the crawler revolving direction by an overlap amount F to constitute, together with the upper surfaces of the first track roller rolling portions 21, track roller rolling paths 22 that are continuous without interruption in the crawler revolving direction.

Although the second track roller rolling portions 15*b* and 16*b* are made slightly shorter in comparison to the lateral slip preventing portions 15*a* and 16*a*, these may instead be substantially the same in length as the lateral slip preventing portions 15*a* and 16*a*. Also, although the upper surfaces of the respective second track roller rolling portions 15*b* and 16*b* are preferably substantially the same in height as the first track roller rolling portions 21, these may instead be of height close to the upper surfaces of the first track roller rolling portions 21 by being made slightly higher or made slightly lower, etc., than the upper surfaces of the first track roller rolling portions 21 within a range of not influencing vibration of the track rollers 5.

The lateral slip preventing portions 15*a* and 16*a* are disposed in proximity to each other in the crawler width direction at the small interval C and the elastic material of the crawler main body 7 is interposed between the lateral slip preventing portions 15*a* and 16*a*.

Also, at the anti-tread side of the crawler main body 7, a covering layer 26 of predetermined thickness is formed along uneven shapes of the core metals 8 such that the engaging portions 12, the guide protrusions 13, the first track roller rolling portions 21, and the second track roller rolling portions 15*b* and 16*b* are embedded, etc., inside the elastic material of the crawler main body 7. Although the covering layer 26 is formed thinly along the uneven shapes of the core metals 8, the covering layer 26 may be omitted such that the uneven shapes of the core metals 8 are exposed.

To facilitate bending of the crawler main body 7, inner recesses 23, outer recesses 24, and connecting recesses 25 are formed at anti-tread side portions of the crawler main body 7 between adjacent core metals 8. The inner recesses 23 are disposed at inner side portions of the crawler main body 7 close to the engaging holes 10 and are formed between the engaging holes 10 and the lateral slip preventing protrusions 15 such as to avoid the guide protrusions 13. The outer recesses 24 are formed at portions of the crawler main body 7 further outward in the crawler width direction than the lateral slip preventing protrusions 16.

The connecting recesses 25 connect the inner recesses 23 and the outer recesses 24 and are formed to bent shapes between the first track roller rolling portions 21 and the second track roller rolling portions 15*b* and 16*b* of the lateral slip preventing protrusions 15 and 16. The connecting recesses 25 each have a first recess 25*a* formed in the crawler revolving direction between the second track roller rolling portions 15*b* and 16*b* of the lateral slip preventing protrusions 15 and 16 and second recesses 25*b* formed in continuation to both sides of the first recess 25*a* in the crawler width direction between the first track roller rolling portion 21 and the respective second track roller rolling portions 15*b* and 16*b*.

The track rollers 5 each integrally include small diameter roller portions 5*a* disposed at central sides in the crawler width direction and large diameter roller portions 5*b* disposed at outer sides of the respective small diameter roller portions 5*a* and the small diameter roller portions 5*a* and the large diameter roller portions 5*b* are arranged to roll in the crawler revolving direction respectively on the third track roller rolling portions 19 of the guide protrusions 13 and on the first track roller rolling portions 21 and the second track roller rolling portions 15*b* and 16*b*.

The elastic crawler 4 of the above arrangement has advantages such as the following. In a state of being wound across the driving wheel 2 and the driven wheel 3, the crawler main body 7 revolves in a forward or reverse direction by being driven by the driving wheel 2 while being guided by the track rollers 5.

Each track roller 5 is such that during revolving of the crawler main body 7, the small diameter roller portions 5*a* thereof roll in the crawler revolving direction on the track roller rolling paths 20 formed by the third track roller rolling portions 19 and the large diameter roller portions 5*b* roll in the crawler revolving direction on the track roller rolling paths 22 formed by the first track roller rolling portions 21 and the second track roller rolling portions 15*b* and 16*b*, and the crawler main body 7 can thus be guided by the track roller 5 at four locations in crawler width direction. Moreover, the track roller rolling paths 20 and 22 at the four locations are continuous in the crawler revolving direction at substantially the same height and without being interrupted mutually between adjacent core metals 8 and therefore vertical vibration of the track rollers 5 during rolling can be lessened.

That is, since the guide protrusions 13 of the respective core metals 8 are of the same height and the third track roller rolling portions 19 on the guide protrusions 13 are such that both end sides of the third track roller rolling portions 19 overlap mutually between adjacent core metals 8 in the crawler revolving direction by the overlap amount A inside view, the small diameter roller portions 5*a* can roll stably without vibrating vertically on the two track roller rolling paths 20 formed at inner sides in the crawler width direction by the third track roller rolling portions 19.

Also, since the first track roller rolling portions 21 and the second track roller rolling portions 15*b* and 16*b* of the core metals 8 are of substantially the same height and moreover, the second track roller rolling portions 15*b* and 16*b* of the respective core metals 8 overlap in the crawler revolving direction by the overlap amount F in side view, the large diameter roller portions 5*b* can roll stably without vibrating vertically on the two track roller rolling paths 22 formed at outer sides in the crawler width direction by the first track roller rolling portions 21 and the second track roller rolling portions 15*b* and 16*b* of the respective core metals 8.

The respective core metals 8 have the lateral slip preventing protrusions 15 and 16 that project to both sides in the crawler revolving direction and the lateral slip preventing portions 15*a* and 16*a* of the lateral slip preventing protrusions 15 and 16 are in a state of being in proximity in the crawler width direction at the small interval C via the elastic material, and therefore, even when an external force in a lateral direction is applied to the core metals 8, the lateral slip preventing portions 15*a* and 16*a* of the lateral slip preventing protrusions 15 and 16 engage to enable prevention of lateral slip of adjacent core metals 8.

Also, the lateral slip preventing portions 15*a* and 16*a* are longer than the second track roller rolling portions 15*b* and 16*b* and therefore, even when a relative angle between two adjacent core metals 8 changes due to bending of the crawler main body 7, etc., an engagement amount of the lateral slip preventing portions 15*a* and 16*a* can be secured sufficiently and surface pressure between the lateral slip preventing portions 15*a* and 16*a* can be suppressed to be low.

Since there are recesses 23 to 25 that are continuous in the crawler width direction between the core metals 8 at the anti-tread side of the crawler main body 7, bendability of the crawler main body 7 between the core metals 8 can be secured easily. For example, since not only are there inner recesses 23 and outer recesses 24 between two adjacent core metals 8 but there are also connecting recesses 25 that connect the inner recesses 23 and the outer recesses 24 between the first track roller rolling portions 21 of one core metal 8 and the lateral slip preventing protrusions 15 and 16 of the other core metal 8, improvement of bendability of the crawler main body 7 between the first track roller rolling portions 21 and the lateral slip preventing protrusions 15 and 16 can be achieved.

Also, although the lateral slip preventing portions 15a and 16a of the respective lateral slip preventing protrusions 15 and 16 are in a state of being in proximity in the crawler width direction, since in addition to there being the second recesses 25b between the first track roller rolling portions 21 and the second track roller rolling portions 15b and 16b, the second track roller rolling portions 15b and 16b on the lateral slip preventing portions 15a and 16a are shifted in the crawler width direction with respect to the lateral slip preventing portions 15a and 16a such that there is an interval in the crawler width direction between the second track roller rolling portions 15b and 16b with the first recess 25a being therein, the crawler main body 7 can be bent easily at these portions as well.

Therefore, regardless of adopting the structure where the second track roller rolling portions 15b and 16b overlap in the crawler revolving direction by the overlap amount F in side view to prevent the vertical vibration of the track rollers 5, the bendability of the crawler main body 7 between the core metals 8 can be improved.

Also, since the lateral slip preventing protrusions 15 and 16 are formed to be of L shapes in cross section with which the second track roller rolling portions 15b and 16b at the upper side are eccentric in the crawler width direction with respect to the lateral slip preventing portions 15a and 16a at the lower side, the first recesses 25a can be disposed easily between the second track roller rolling portions 15b and 16b and a weight of each entire core metal 8 including the lateral slip preventing protrusions 15 and 16 can be lightened. Also, since the lateral slip preventing protrusions 15 and 16 have the lateral slip preventing portions 15a and 16a and the second track roller rolling portions 15b and 16b, an effect of mutual reinforcement is provided.

Figure 11:
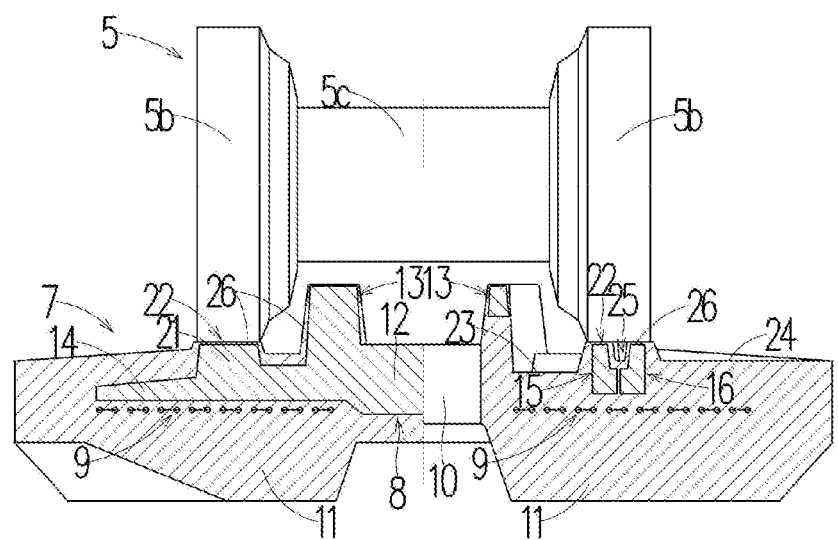
FIG. 11 is a front sectional view of an elastic crawler that illustrates a second embodiment of the present invention.

FIG. 11 illustrates a second embodiment of the present invention. With this embodiment, the track wheels 5 each include large diameter roller portions 5b at both ends of a small diameter shank portion 5c and are arranged such that the large diameter roller portions 5b roll on the first track roller rolling portions 21 and the second track roller rolling portions 15b and 16b. The arrangements of crawler main body 7, the core metals 8, etc., at the elastic crawler 4 side are the same as in the first embodiment.

It is thus also possible for the track wheels 5 to be arranged such that the large diameter roller portions 5b at both ends roll on the two track roller rolling paths 22 formed by the first track roller rolling portions 21 and the second track roller rolling portions 15b and 16b. In this case, since the large diameter roller portions 5b at both ends of the track wheels 5 roll on the two track roller rolling paths 22 at the outer sides in the crawler width direction of the crawler main body 7, lifting of the crawler main body 7 can be prevented at two locations at the outer sides in the crawler width direction by each track roller 5.

Also, since just the track wheels 5 having the large diameter roller portions 5b at both ends are used and the arrangements of the elastic crawler 4 including the crawler main body 7, the core metals 8, etc., are the same as in the first embodiment, the same effects as the first embodiment, such as being capable of securing the bendability of the crawler main body 7 while suppressing the vertical vibration of the track rollers 5, etc., can be exhibited.

Further, since the second embodiment differs just in the point of using the track wheels 5 having the large diameter roller portions 5b with respect to the first embodiment that uses the track wheels 5 having the small diameter roller portions 5a and the large diameter roller portions 5b, the elastic crawler 4 can be used in common in either of the respective embodiments. Consequently, general applicability of the elastic crawler 4 is improved and an advantage of enabling reduction of manufacturing cost is provided.

Here, although the elastic crawler 4 of the second embodiment is arranged in the same manner as the first embodiment, there is no need to arrange the top surfaces of the guide protrusions 13 to be flat and the shape thereof can be arranged arbitrarily.

Figure 12:
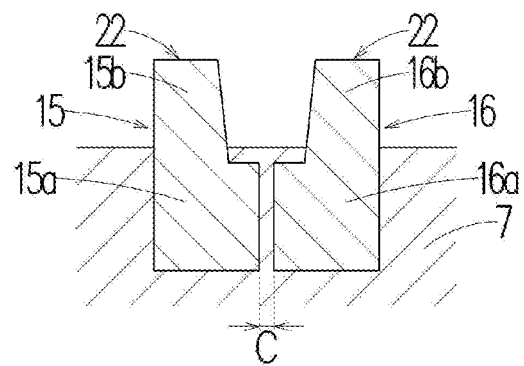
FIG. 12 is an enlarged sectional view of principal portions that illustrates a third embodiment of the present invention.

FIG. 12 illustrates a third embodiment of the present invention. In this embodiment, the second track roller rolling portions 15b and 16b of the lateral slip preventing protrusions 15 and 16 are arranged to be exposed from the anti-tread side of the crawler main body 7. Even in such a case where the second track roller rolling portions 15b and 16b are exposed, the vertical vibration of the track rollers 5 can be prevented and the bendability of the crawler main body 7 can be secured.

Figure 13:
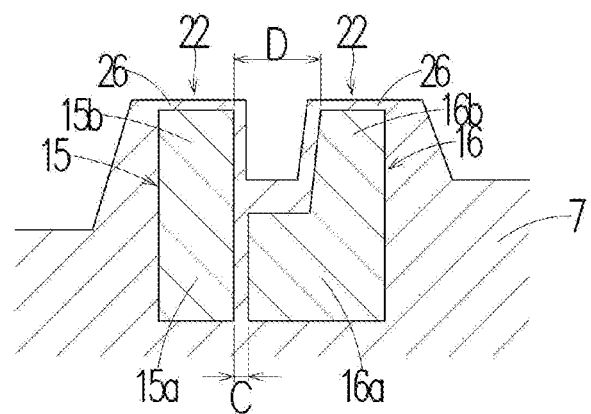
FIG. 13 is an enlarged sectional view of principal portions that illustrates a fourth embodiment of the present invention.

FIG. 13 illustrates a fourth embodiment of the present invention. In this embodiment, of the two lateral slip preventing protrusions 15 and 16 that are adjacent in the crawler width direction, one lateral slip preventing protrusion 15 is arranged to be of rectangular shape in cross section and the other lateral slip preventing protrusion 16 is arranged to be of L shape in cross section. Even in such a case, the second track roller rolling portions 15b and 16b at the upper sides of the lateral slip preventing portions 15a and 16a can be separated in the crawler width direction.

Figure 14:
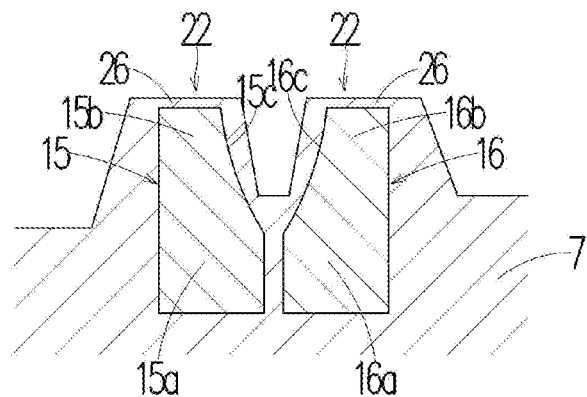
FIG. 14 is an enlarged sectional view of principal portions that illustrates a fifth embodiment of the present invention.

FIG. 14 illustrates a fifth embodiment of the present invention. In this embodiment, notched portions 15c and 16c are provided by making opposing sides of the second track roller rolling portions 15b and 16b on the lateral slip preventing portions 15a and 16a of the lateral slip preventing protrusions 15 and 16 be of inclined shapes, etc., to separate the second track roller rolling portions 15b and 16b in the crawler width direction. It is thus also possible to provide the notched portions 15c and 16c at the lateral slip preventing protrusions 15 and 16. The shapes of the lateral slip preventing protrusions 15 and 16 can thus be modified variously as in this case and are not limited to L shapes in cross section.

Figure 15:
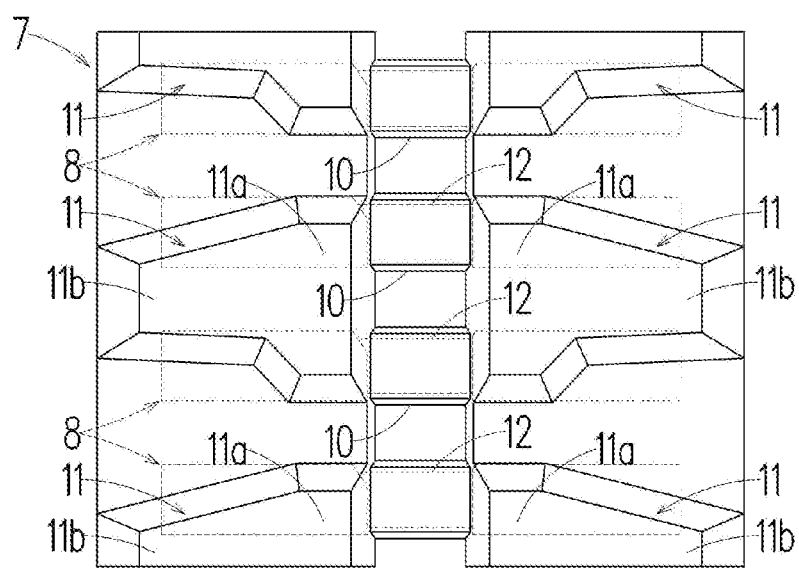
FIG. 15 is an enlarged sectional view of principal portions that illustrates a sixth embodiment of the present invention.

FIG. 15 illustrates a sixth embodiment of the present invention. In this embodiment, the drive lugs 11 at the tread side of the crawler main body 7 are such that one drive lug 11 is disposed across two core metals 8 that are adjacent in the crawler revolving direction. Also, the respective drive lugs 11 are disposed to be right-left symmetrical. The drive lugs 11 may be disposed in such manner as well. The configuration, etc., of the drive lugs 11 can thus be changed arbitrarily.

Although the respective embodiments of the present invention have been described in detail above, the present invention is not restricted to these embodiments and various modifications are possible. For example, although in each of the embodiments, although the drive lugs 11 that constitute two lug columns at the right and left at the tread side of an outer periphery of the crawler main body 7 are provided, the shape, structure, and configuration of the drive lugs 11 can be modified arbitrarily.

If the track roller rolling portions 15*b*, 16*b*, and 21 are provided at both sides in the crawler width direction, the track rollers 5 that roll on the track roller rolling portions 15*b*, 16*b*, and 21 at both sides may be arranged separately in the crawler width direction. It suffices that the respective lateral slip preventing protrusions 15 and 16 have structures such that an interval between the lateral slip preventing portions 15*a* and 16*a* is greater than an interval between the second track roller rolling portions 15*b* and 16*b*.

Although the crawler main body 7 is provided with the first recesses 25*a* formed in the crawler revolving direction between the second track roller rolling portions 15*b* and 16*b* of the lateral slip preventing protrusions 15 and 16 that are adjacent in the crawler width direction and the second recesses 25*b* formed in the crawler width direction between the first track roller rolling portions 21 and tip sides of the second track roller rolling portions 15*b* and 16*b*, the first recesses 25*a* and the second recesses 25*b* may be omitted.

What is claimed is:

1. An elastic crawler comprising: a crawler main body that is mainly constituted of an elastic material; and core metals that are embedded at substantially equal intervals in a crawler revolving direction inside the crawler main body,
   wherein the core metals each include an engaging portion, guide protrusions disposed at both sides in a crawler width direction with respect to the engaging portion, and lateral slip preventing protrusions that at outer sides in the crawler width direction with respect to the respective guide protrusions project to both sides in the crawler revolving direction and prevent lateral slip in the crawler width direction of adjacent ones of the core metals in the crawler revolving direction; and
   further comprising: track roller rolling paths in the crawler revolving direction at the outer sides in the crawler width direction with respect to the respective guide protrusions; and
   wherein the respective track roller rolling paths include first track roller rolling portions provided on the core metals between the respective lateral slip preventing protrusions at both sides in the crawler revolving direction and second track roller rolling portions that are provided on the respective lateral slip preventing protrusions at both sides in the crawler revolving direction,
   the respective lateral slip preventing protrusions have the second track roller rolling portions on lateral slip preventing portions that are at a lower portion side, between the respective lateral slip preventing protrusions of the adjacent core metals, the lateral slip preventing portions are provided in proximity in the crawler width direction, the second track roller rolling portions are provided such as to be separated in the crawler width direction further than an interval between the lateral slip preventing portions,
   of the respective lateral slip preventing protrusions at both sides in the crawler revolving direction of the core metal, the lateral slip preventing protrusion at one of the sides is disposed at a side of the first track roller rolling portion close to the guide protrusion, and the lateral slip preventing protrusion at the other side is disposed at a side of the first track roller rolling portion far from the guide protrusion, and between the respective lateral slip preventing protrusions of the adjacent core metals, tip sides of the respective lateral slip preventing portions are provided in an overlapping manner in the crawler width direction, and tip sides of the respective second track roller rolling portions are provided in an overlapping manner in the crawler width direction, and
   between the respective lateral slip preventing protrusions that are adjacent in the crawler width direction at the outer sides of the respective guide protrusions of the adjacent ones of the core metals, an interval in the crawler width direction between the respective second track roller rolling portions is greater than an interval in the crawler width direction between ones of the respective lateral slip preventing portions that are adjacent in the crawler width direction at the outer sides of the respective guide protrusions.

2. The elastic crawler according to claim 1, wherein between the respective lateral slip preventing protrusions that are adjacent in the crawler width direction, at least one of the lateral slip preventing protrusions is provided with the lateral slip preventing portion and the second track roller rolling portion to be of L shape in cross section.

3. The elastic crawler according to claim 1, wherein the respective lateral slip preventing protrusions have at least the lateral slip preventing portions embedded inside the crawler main body.

4. The elastic crawler according to claim 1, wherein the crawler main body has first recesses in the crawler revolving direction that are formed between the second track roller rolling portions of the lateral slip preventing protrusions that are adjacent in the crawler width direction and second recesses in the crawler width direction that are formed between the first track roller rolling portions and the second track roller rolling portions in continuation to the first recesses.

5. The elastic crawler according to claim 1, wherein upper surfaces of the respective second track roller rolling portion are of substantially the same height as or of a height close to the upper surfaces of the first track roller rolling portions.

6. The elastic crawler according to claim 1, wherein the second track roller rolling portions are of substantially the same or shorter than the projection length in the crawler revolving direction of the lateral slip preventing portions.

7. The elastic crawler according to claim 1, wherein the core metals each include an engaging portion positioned between engaging holes of the crawler main body, guide protrusions projecting from both sides of the engaging portion toward an anti-tread side of the crawler main body, and blade portions provided at outer sides in the crawler width direction with respect to the guide protrusions.

* * * * *